US007170244B2

(12) United States Patent
Choby

(10) Patent No.: US 7,170,244 B2
(45) Date of Patent: Jan. 30, 2007

(54) POWER CLOSURE WITH ANTI-PINCH

(75) Inventor: David A. Choby, Rochester Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/084,542

(22) Filed: Mar. 18, 2005

(65) Prior Publication Data

US 2006/0208678 A1 Sep. 21, 2006

(51) Int. Cl.
*H02P 1/00* (2006.01)

(52) U.S. Cl. ...................... 318/280; 318/461; 318/466; 318/286; 49/26; 49/28

(58) Field of Classification Search ................ 318/461, 318/280, 283, 286, 466, 468; 49/26, 28
See application file for complete search history.

(56) References Cited

U.S. PATENT DOCUMENTS

| | | | | |
|---|---|---|---|---|
| 4,347,465 | A | 8/1982 | Goertler et al. | |
| 4,468,596 | A | 8/1984 | Kinzl et al. | |
| 4,585,981 | A | 4/1986 | Zintler | |
| 4,641,067 | A | 2/1987 | Iizawa et al. | |
| 4,709,196 | A | 11/1987 | Mizuta | |
| 4,746,845 | A | 5/1988 | Mizuta et al. | |
| 5,334,876 | A * | 8/1994 | Washeleski et al. | 307/10.1 |
| 5,436,539 | A | 7/1995 | Wrenbeck et al. | |
| 5,530,329 | A * | 6/1996 | Shigematsu et al. | 318/469 |
| 5,585,702 | A | 12/1996 | Jackson et al. | |
| 5,585,705 | A | 12/1996 | Brieden | |
| 5,610,484 | A | 3/1997 | Georgin | |
| 5,872,436 | A | 2/1999 | Bergmann et al. | |
| 5,932,931 | A * | 8/1999 | Tanaka et al. | 307/10.1 |
| 5,994,858 | A | 11/1999 | Miura | |
| 6,274,947 | B1 * | 8/2001 | Terashima | 307/10.1 |
| 6,366,042 | B1 * | 4/2002 | Gerbetz | 318/286 |
| 6,408,238 | B1 * | 6/2002 | Lamm et al. | 701/49 |
| 6,548,974 | B2 | 4/2003 | Filgueiras | |
| 6,580,242 | B2 * | 6/2003 | Hirose et al. | 318/445 |

* cited by examiner

*Primary Examiner*—Rina Duda
(74) *Attorney, Agent, or Firm*—Dean B. Watson; Dura Automotive Systems, Inc.

(57) ABSTRACT

A power closure system with anti-pinch having a closure, a motor operatively connected to the closure, a sensor operatively producing signals indicative of motor speed, an anti-pinch activator coupled to the sensor and the motor, the anti-pinch activator including a predetermined trigger value; a measured value; a stored value; a comparator for comparing the measured value with the stored value and initiating a pinch response when the difference between the measured value and the stored value is greater than the trigger value; and a predetermined modifying calculation for changing the stored value when the measured value indicates a motor speed less than the motor speed indicated by the stored value.

17 Claims, 6 Drawing Sheets

Counts of Time --- Increments of time measured by the timer of the micro-controller

Tn ------------- Total number of "Counts of Time" between two consecutive Hall pulse edges

Rn ----------------------- Various registers of the micro-controller

| Look Up Table | | |
|---|---|---|
| **Stored Value** in Counts of Time | **Trigger Value** in Counts of Time | **Correction Factor** in Counts of Time |
| > = 1051 | 125 | 4 |
| 1050 to 901 | 105 | 3 |
| 900 to 791 | 95 | 3 |
| 790 to 661 | 75 | 3 |
| 660 to 570 | 53 | 2 |
| 569 to 481 | 38 | 2 |
| 480 to 411 | 27 | 2 |
| 410 to 351 | 20 | 1 |
| < = 350 | 14 | 1 |

FIG. 3

Counts of Time --- Increments of time measured by the timer of the micro-controller

Tn ------------ Total number of "Counts of Time" between two consecutive Hall pulse edges

Rn -------------------- Various registers of the micro-controller

POWER CLOSURE WITH ANTI-PINCH

FIELD OF INVENTION

The invention relates to systems for monitoring and controlling the movement of closure devices which may be adjusted by means of motors, and more particularly to anti-jamming/anti-pinch systems for power closures, such as vehicle power windows, powered doors, and sliding roofs.

BACKGROUND OF THE INVENTION

To address safety concerns in power operated closures in motor vehicles, a number of systems have been developed. These systems typically have a closure, a motor coupled with the closure, a sensor, and a processor with an algorithm for evaluating system data and initiating an anti-pinch (a stop or reverse direction) response. Systems have been developed that monitor current, speed or voltage changes to determine if a jam event has occurred. Examples of anti-pinch systems include those disclosed in U.S. Pat. Nos. 6,548,974, 5,994,858; 5,872,436; 5,610,484; 5,585,705; 5,585,702; 5,436,539; 4,746,845; 4,709,196; 4,641,067; 4,585,981; 4,468,596; and 4,347,465; the disclosures of which are hereby incorporated herein by reference.

Federal Motor Vehicle Safety Standard 118 (FMVSS 118) was established in 1991 to set some specific requirements for certain power operated windows, partitions, and roof panel systems in motor vehicles to minimize the likelihood of death or injury from accidental operation. The standard under certain circumstances requires a power-operated window to reverse prior to generating 100 N of compressive force on an obstruction. The compressive force is to be measured by test rods, one of which has a diameter of up to 25 mm and a spring constant of 65 N/mm, and another with a diameter up to 200 mm and a spring constant of 20 N/mm—see 49 C.F.R. 571.118.

However, present day systems have one or more limitations which do not satisfactorily address manufacturing variability and tolerance stack-up, system compliance, a wide range of environmental operating conditions, system wear, governmental regulations, or various window designs in a robust and simple manner. Therefore, what is needed is a system for monitoring and controlling the movement of power closures that reduces or overcomes one or more of the short comings of present day systems.

SUMMARY OF THE INVENTION

Disclosed herein is a power closure comprising a simple and robust system which can detect a jamming event and/or initiate an anti-pinch response.

In accordance with a preferred embodiment, the power closure system includes a closure, an electric motor operatively connected to the closure; a sensor operatively producing signals indicative of the motor speed; and an anti-pinch activator in communication with the sensor and the motor.

The power closure may be any suitable power closure device, such as a powered window for an automobile, moon roof, sliding door, hinged door, etc. The sensor may be any suitable sensing device, such as a position sensor, hall effect sensor, etc. The anti-pinch activator may be any device suitable for initiating an anti-pinch response, such as a processor and/or circuit, circuit board, computer chip, and/or storage device, which may further include suitable programming, such as an instruction set for an algorithm.

The anti-pinch activator preferably includes a predetermined Trigger Value; a Measured Value corresponding to a speed of the motor; a Stored Value created from a Measured Value; a comparator for comparing the Stored Value to the Measured Value and initiating an anti-pinch response when the difference between the Stored Value and the Measured Value is greater than the Trigger Value and the speed of the closure is decreasing; a predetermined modifying calculation for changing the Stored Value to a new Stored Value when there is a difference between the Measured Value and the Stored Value and the motor speed indicated by the Measured Value indicates a motor speed less than the motor speed indicated by the Stored Value.

One of the issues with existing anti-pinch systems is being able to distinguish an anti-pinch event from a natural variation in the speed of the closure movement. For example, while the closure is moving an obstructing object in the path of the closure will eventually result in a reduction in the speed of closure movement. However, there are many naturally occurring events that can also cause variations in speed, such as build variations between closure systems and variations in seal resistance. Many of these naturally occurring events not only cause variation from system to system but can cause variation within the system, such as varying speeds of the closure over the path of travel during a single closing. Examples of events that can cause variation within a system include environmental conditions, such as ice, extreme temperature conditions, dirt accumulation in localized areas etc.

The difficulty of differentiating between natural variations and a 'true' pinch event is addressed with the disclosed anti-pinch activator and the use of a 'Stored Value'. The Stored Value is a function of a Measured Value. The 'Measured Value' corresponds closely to the current or more recent speed of the closure. The Measured Value may be determined each time a signal from the sensor indicates a predetermined amount of closure movement. The Stored Value may be created from a Measured Value at some point in time and is preferably stored electronically, such as in a microprocessor. Both the Measured Value and the Stored Value therefore correspond to a speed of the closure. The preferred algorithm of the anti-pinch activator keeps the values of Measured Value and Stored Value nearly equal when the closure is accelerating or moving at constant speed, e.g. when a pinch event is not being experienced. Whenever the speed of the closure is decelerating, and this could be from natural variations or from a pinch event, the Stored Value is not necessarily kept equal to the Measured Value. Instead, each time a Measured Value is obtained which corresponds to a slower closure speed compared to the Stored Value, the Stored Value is changed by a predetermined modifying calculation. Under conditions of natural speed variation, where the closure is decelerating slowly, the algorithm preferably keeps the Stored Value very close to the Measured Value. If the Stored Value and the Measured Value are kept close, the difference between the two is small enough that a pinch event will not be initiated. However, when the closure is decelerating more rapidly, as for example when the closure encounters an obstruction in its path, the algorithm will not keep the Stored Value nearly equal to the Measured Value. In that case, the predetermined modifying calculations preferably allows the two values to diverge until the difference is large enough to surpass a 'Trigger Value' and initiate a pinch event. Because of the flexibility of this type of system, the system can be fined tuned to any number of closure systems to filter out naturally occurring variations and still respond to a pinch event.

In one embodiment of the anti-pinch system, it may be useful for the Measured Value to correspond to the speed of the closure by measuring the speed of the driving motor. This may include any measurement that indicates motor speed, such as revolutions of the motor, motor shaft rotation, time of a motor revolution or a partial revolution, etc. These measurements may be obtained directly from the motor or down stream of any speed-adjusting gearbox associated with the motor. While it is possible to determine motor speed with a single measurement, it may be useful with other embodiments to calculate the measured value from multiple measurements of the motor speed. Using averages or totals tends to reduce the variation that may occur due to manufacturing variations and/or random measuring errors. The Measured Value is preferably handled as a single value, whether it is based on a single or on multiple measurements. Each time a new measurement of the motor is obtained, a new value of Measured Value can be set.

In another embodiment, the initial Stored Value is determined first from an initial value of the Measured Value. Thus, the first value of the Stored Value will be equal to the first Measured Value. The subsequent values of the Stored Value will preferably depend upon subsequently determined values of the Measured Value and upon the application of the modifying calculation. In the case where the speed of the motor is increasing, the value of the Stored Value is preferably replaced by a new value of the Measured Value. However, this replacement by substitution preferably does not occur when the motor speed is decreasing. Instead, when the motor speed is decreasing, the stored value is preferably modified by a predetermined modifying calculation. This calculation can consist of adding or subtracting a value or multiplying or dividing by a factor.

Earlier, it was discussed how the speed of the closure can vary during the process of closing or opening the closure. It is noted that the closure speed can vary greatly for a single closure from one opening or closure to another opening or closure. For instance, a vehicle parked out of doors in sub zero temperatures will see slower closure speeds. However, if the vehicle is then moved to a heated garage and the vehicle is allowed to warm, the next movement of the closure should be much faster. Speed variation may be a function of seal resistance, which will typically be lessened by increasing temperatures. Also, variation in voltage supplied to the motor from the vehicle's battery from one closing cycle to another can result in wide variations in speed of the closure. With the engine of the vehicle not running, the closure could be powered by an older weaker battery, which provides a relatively low voltage. A moment later, with the engine running and with a higher voltage being provided by the alternator of the vehicle, the closure will move much faster.

Thus, in another embodiment of the anti-pinch system, compensation can be provided for a wide variation in the expected operational speed of the closure. This may be accomplished in a number of ways, such as providing multiple values for the Trigger Value or adjusting the modifying calculation. For example, the expected operational speed range of the motor may be broken-up into sequential increments with a different value of Trigger Value assigned to each increment. These increments may be very small resulting in a large number of Trigger Values or the increments may be larger resulting is fewer values for Trigger Value. Variations in closure systems and the level of desired anti-pinch performance should determine the number of increments required for each application. Alternatively or in addition thereto, the modifying calculations applied to the Stored Value can also have multiple values correlated to the operational speed of the closure.

In still other preferred embodiments, the anti-pinch activator is adapted to meet both the U.S. safety standards and the European safety standards for powered closures for automobiles. In a preferred embodiment, the anti-pinch activator is adapted to initiate an anti-pinch response when the compression force in the closing path is 100 N or less when measured with spring constants of 10, 20 and 65 Newtons per millimeter. This may be accomplished by adjusting the Trigger Value and/or the modifying calculation (s) for a particular closure system.

Another issue with some existing anti-pinch systems is the occurrence of 'false reversals'. A false reversal is an event where the movement of the glass is stopped and/or reversed when there is really no anti-pinch obstacle in the path of the closure. A false reversal can occur when the anti-pinch actuator is set too sensitive. A false reversal can also occur when there is wide variation in the speed of the closure resulting from environmental changes or wear of the seals over time. Therefore, in accordance herewith, the Trigger Value and/or the modifying calculation can be used to increase or decrease the sensitivity of the anti-pinch response. And since both of these can be set as functions of the operating speed of the closure, good robustness against false reversals can be obtained.

During closure movement it may be desirable to only activate the anti-pinch system during a portion of closure travel. As such, the anti-pinch function can be turned off as the closure is driven into a seal to firmly seat the closure in the fully closed position while generating the necessary sealing force to insure against intrusion of air or water. To ignore initial and/or end travel conditions the anti-pinch activator may be idle, disabled, by-passed, or turned off in some manner over that portion of travel. A preferred range of travel ignores either the initial travel conditions or the end of travel conditions or both, such as the first 200 mm and the last 4 mm of travel depending on the size of the overall closure opening.

BRIEF DESCRIPTION OF THE DRAWINGS

FIG. 3 is an example of a look-up table.

DETAILED DESCRIPTION OF PREFERRED EMBODIMENTS

Figure 1:
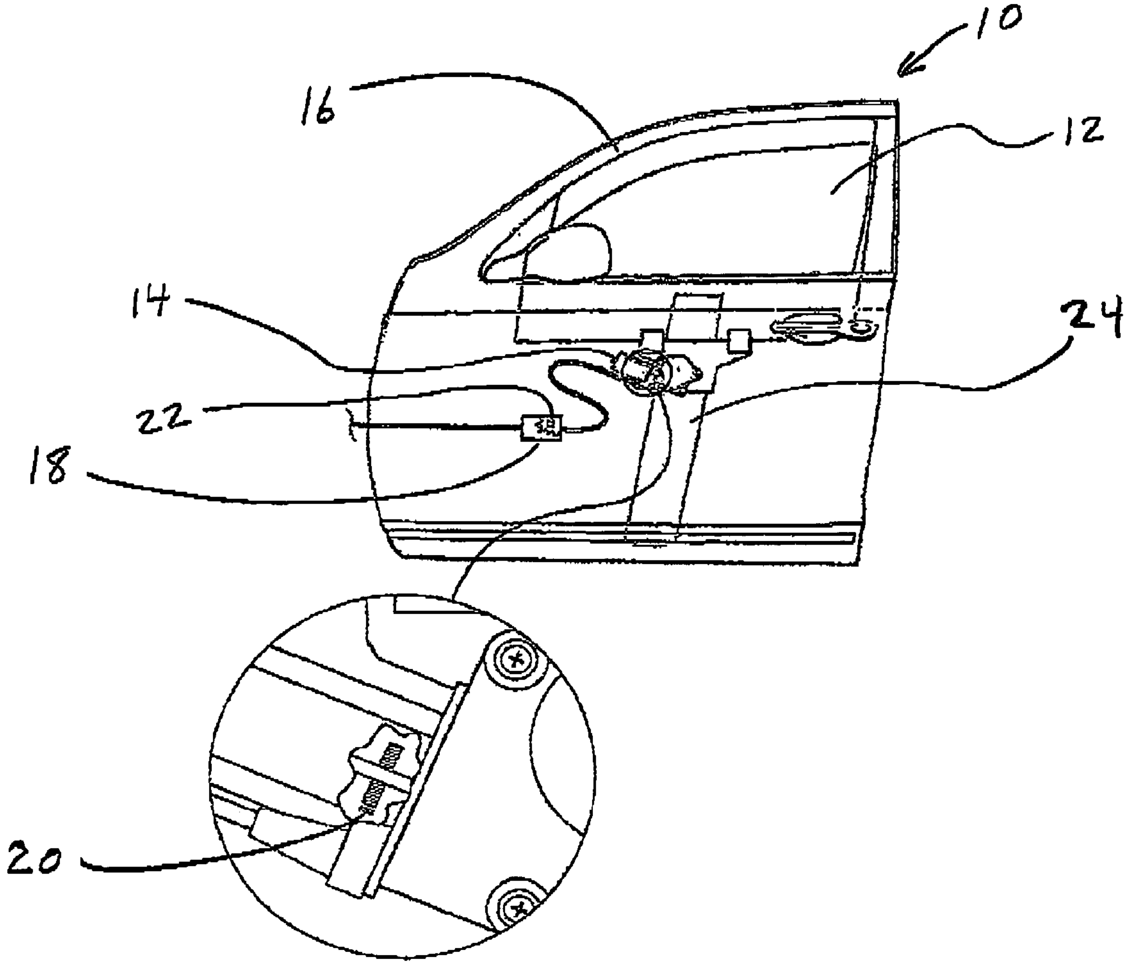
FIG. 1 is an environmental view of a power closure system having an anti-pinch activator in a vehicle door.
Figure 4:
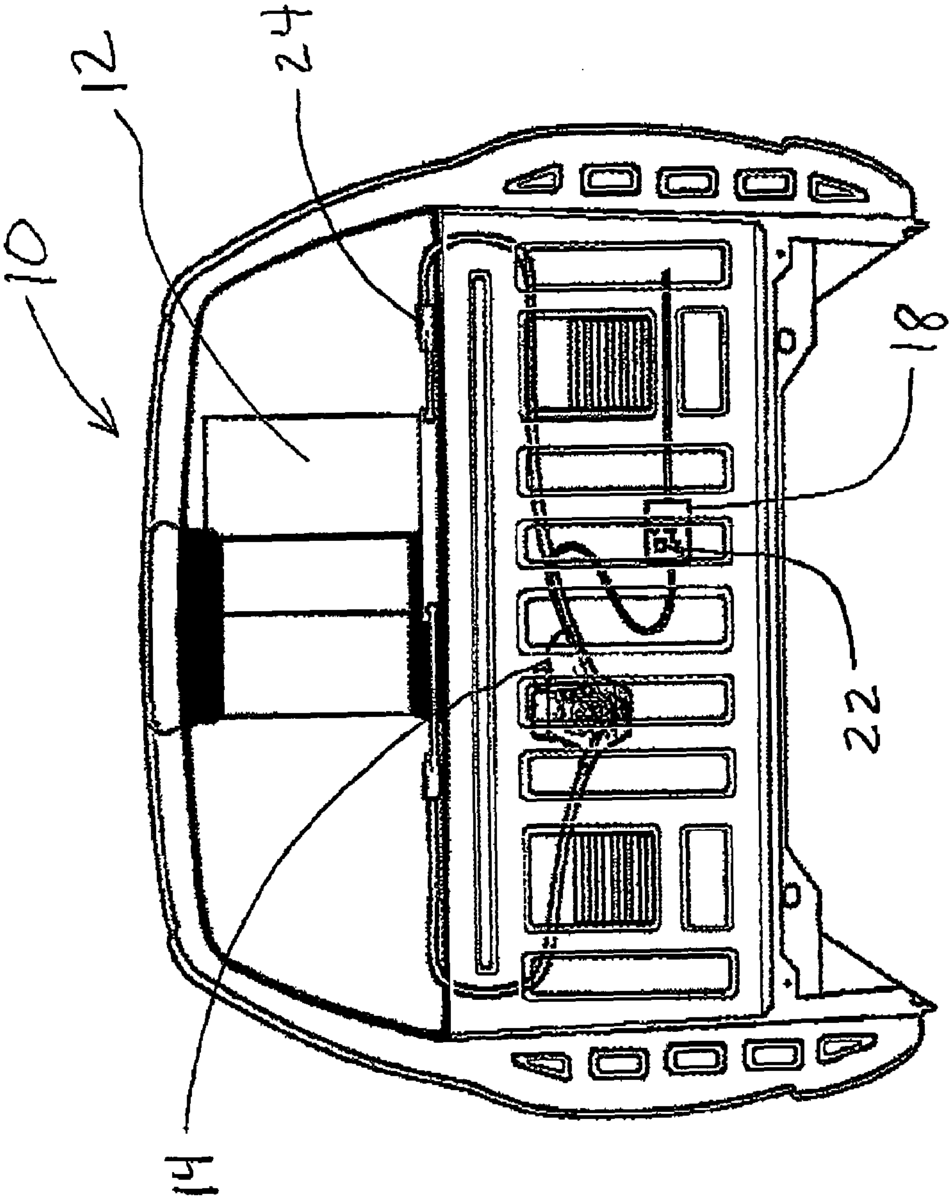
FIG. 4 is an environmental view of a power closure system having an anti-pinch activator for a vehicle rear window.
Figure 5:
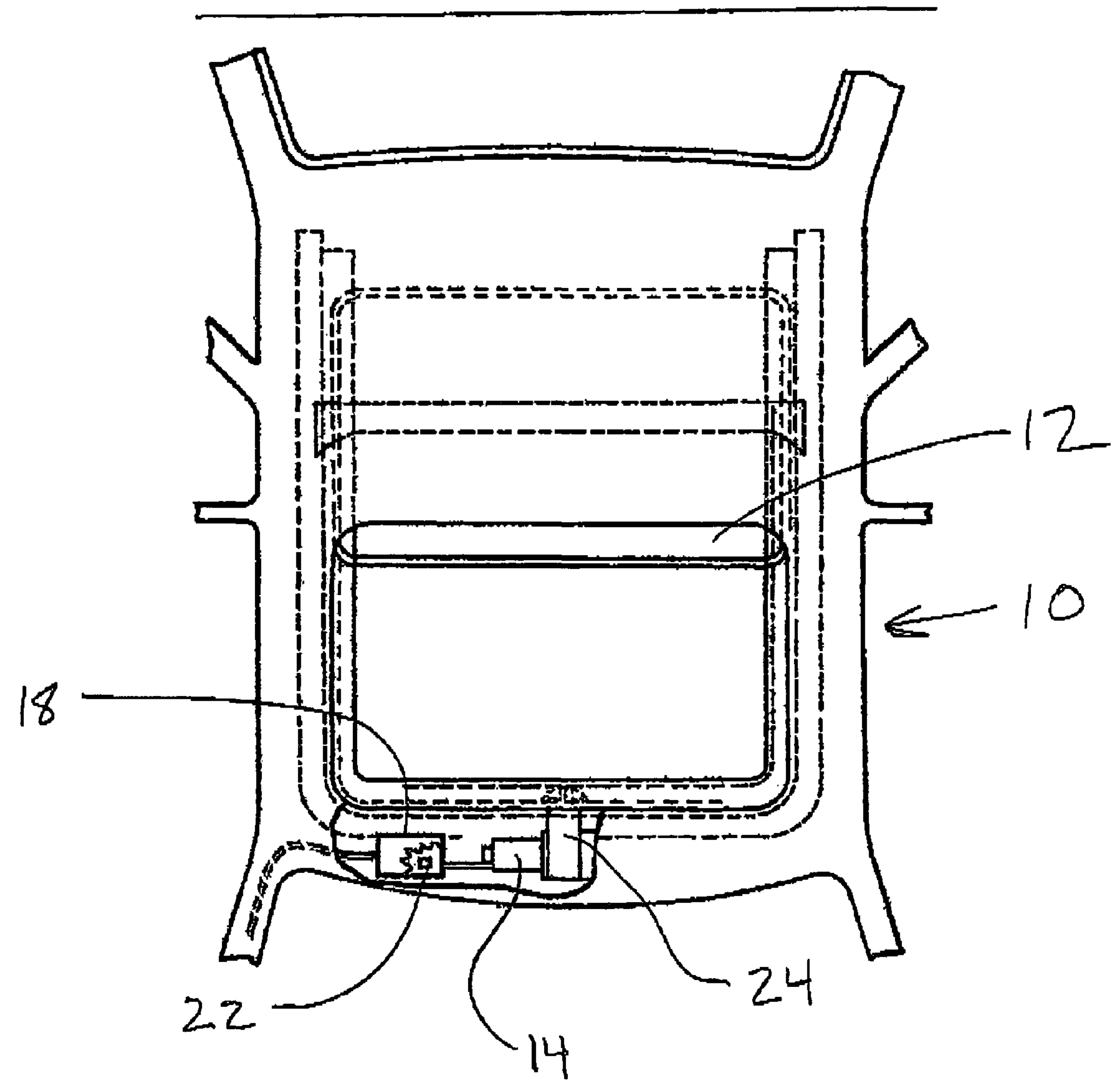
FIG. 5 is an environmental view of a power closure system having an anti-pinch activator for a vehicle sunroof.
Figure 6:
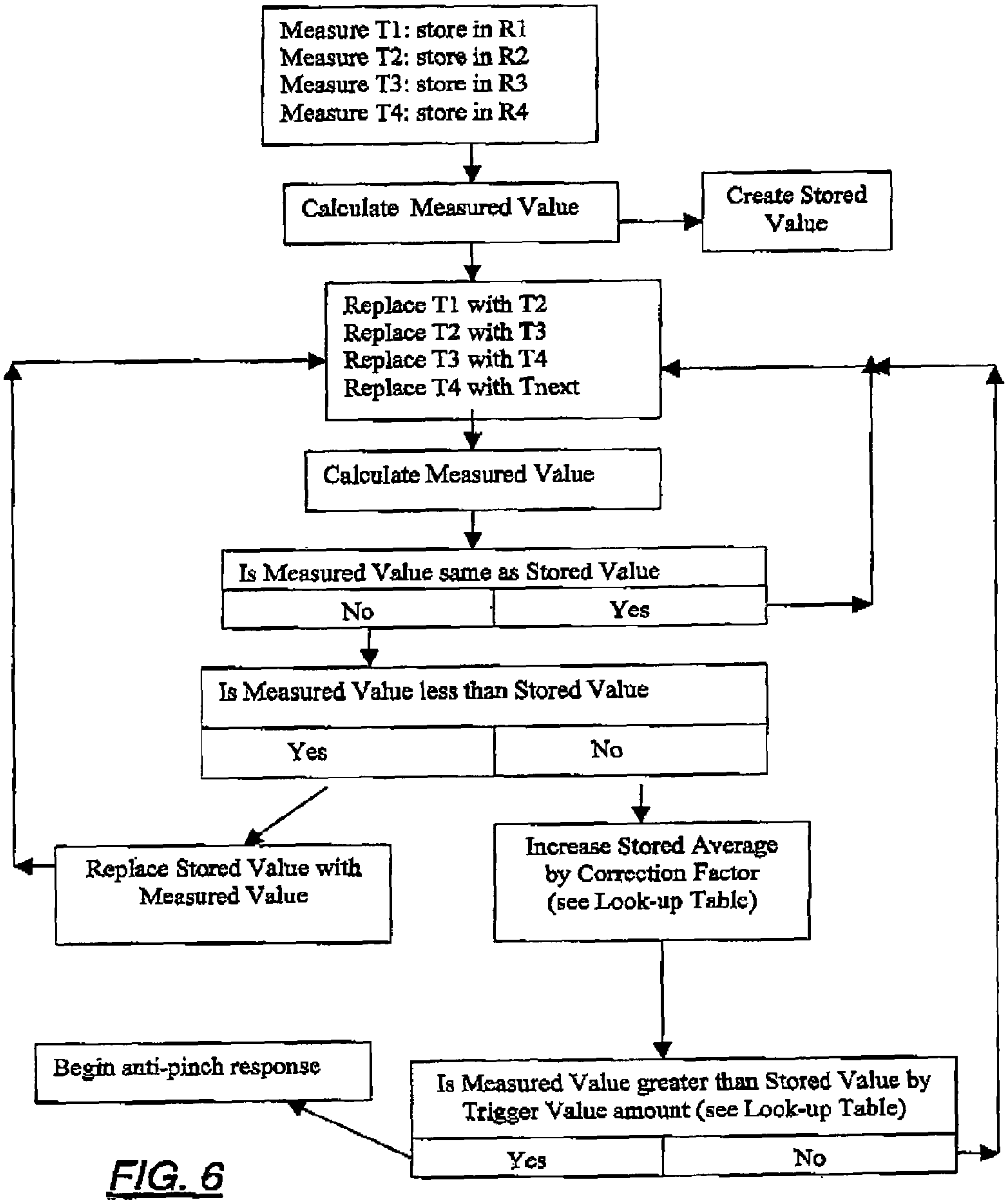
FIG. 6 is a schematic flow chart showing the operation of another embodiment of an anti-pinch algorithm.

FIGS. 1, 4 and 5 show a closure system 10 for a motor vehicle with anti-pinch including a closure 12, a motor 14 having an output shaft for driving the closure 12, a closure frame 16 for guiding the closure 10, and a drive system 24 coupled to the motor 14 for providing movement to the closure 10 and an anti-pinch activator 18. A preferred drive system include a rack and pinion system having a closure support, but any suitable drive system may be used, such a push pull cable system, pull pull cable system, arm and sector, power sliding, etc. The closure system 10 preferably includes a sensor coupled to the motor for measuring motor activity.

The anti-pinch activator of a preferred embodiment includes of a micro-controller 22, such as the PIC16F684 micro-controller, manufactured by Microchip. The micro-controller preferably contains an internal timer that can measure discrete increments of time. The timer is preferably used in conjunction with a displacement sensor 20, such as a Hall Effect sensor, to measure the time for a predetermined amount of rotation of the drive motor. The time increment used by the timer is preferably configurable.

Now by way of example and for purposes of understanding, the closure system includes a Hall Effect sensor and the motor includes a magnet which rotates with the motor shaft and has eight poles, keeping in mind that motors with less or more than eight poles could also be utilized with the algorithm, a different sensor can be used, and other adjustments can be made all of which should be considered as part of the invention with out limitation unless so specified in by Claims. The timer of the micro-controller is set to four microseconds per count of time (0.000004 sec./Ct.). The motor includes the multi pole-magnet that rotates with the motor shaft and triggers a signal from the Hall Effect Sensor each time one of the poles of the multi-pole magnet rotates past the Hall Effect Sensor. The micro-controller counts the total number of Counts of Time between two consecutive Hall Effect signals and stores this number in memory. This number represents the period of one eight of a rotation of the motor and this period is inversely proportional to the rotational speed of the motor shaft and thus is also inversely proportional to the speed of the closure.

Figure 2:
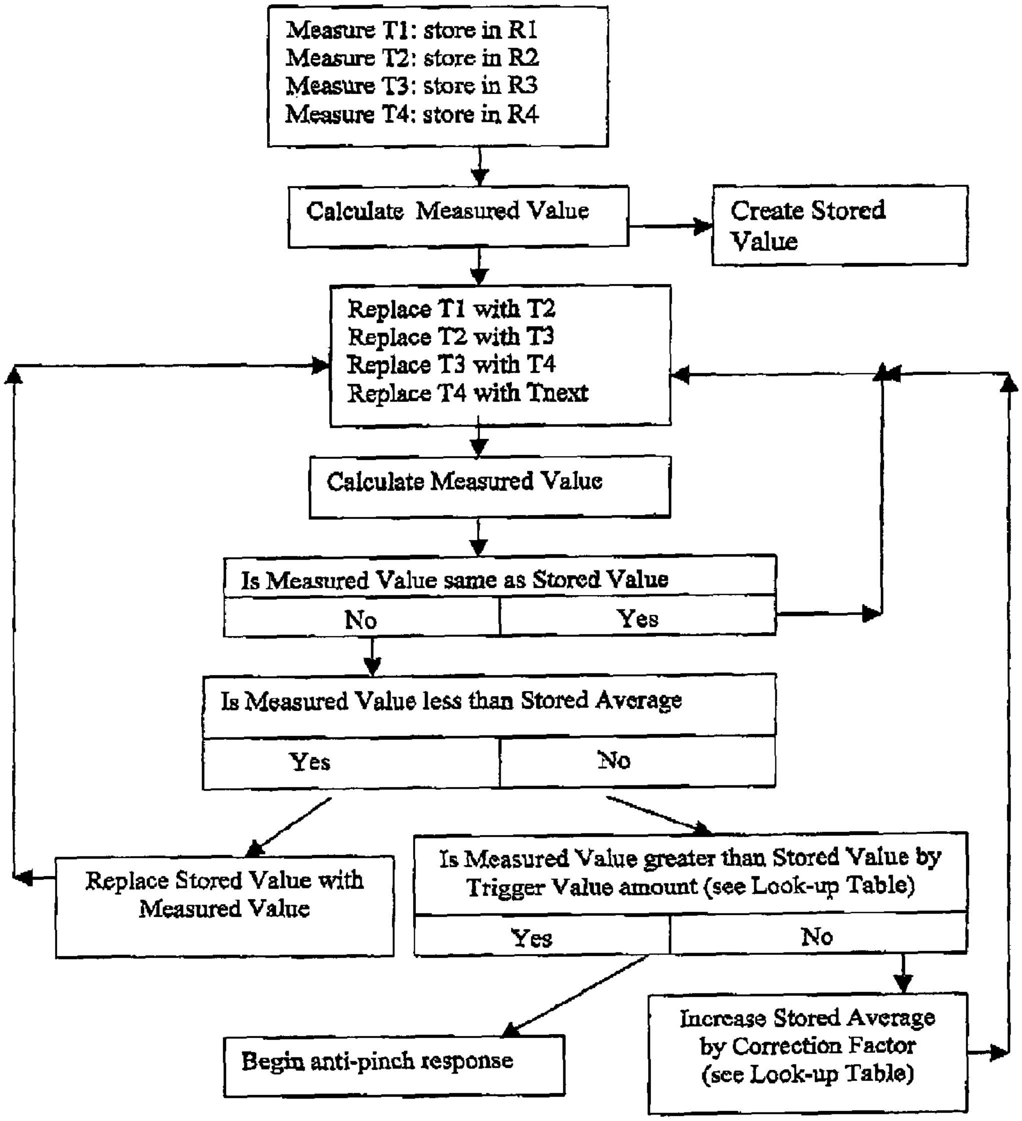
FIG. 2 is a schematic flow chart showing die operation of an anti-pinch algorithm.

FIG. 2 shows an example algorithm used with the eight pole motor and Hall Effect sensor. Referring to FIG. 2, the first measured time T, between two consecutive Hall Effect signals is designated T1, and represents, in this particular case utilizing an eight pole magnet, one eighth of a motor revolution. This value is stored in one of the registers of the micro-controller. Subsequently, T2, T3, and T4 are similarly measured. In this example, four values of measured time T are being averaged. By utilizing the eight-pole magnet, this average is generated over one half of a motor revolution. Each time this average is calculated, it represents the Measured Value in this example. The first time this average is calculated, it also defines the first or initial value for the Stored Value. The Stored Value is placed in a memory location of the micro-controller. Thereafter, another Measured Value is calculated each time data is received indicating another one eighth of a motor revolution. This new data is used in calculating the average while the oldest piece of data is dropped from the average. This new value of Measured Value is then compared to the Stored Value. If the two values are the same, nothing happens and the next Measured Value is again calculated when the next data is received indicating yet another one eighth of a motor revolution. If the Measured Value, which is inversely proportional to the closure speed, is less than the Stored Value, indicating an increase in motor speed, then the Stored Value is replaced by the current value of the Measured Value. If the Measured Value is greater than the Stored Average, indicating a slower speed of the motor compared to the Stored Value, then the difference between the Measured Value and the Stored Value is calculated (hereafter Calculated Difference) and compared to a number (Trigger Value, later discussed in detail) from the Look-Up Table (also discussed later in detail) corresponding to the value of the Stored Value. If the Calculated Difference is greater than the Trigger Value obtained from the Look Up Table, then the anti-pinch response is initiated, which may include reversing the motor and moving the window a predetermined distance away from the pinch event. If the Calculated Difference is not greater than the Trigger Value then a small number of counts of time (Correction Factor) are subtracted from the Stored Value. The Correction Factor of this preferred embodiment represents the predetermined modifying calculation described for this invention. The Correction Factor may also be obtained from the Look Up Table and is preferably a function of the operational speed of the motor as represented by the Stored Value. In an alternative embodiment the Correction Factor may be applied to the Stored Value before the Calculated Difference is used to determine if a pinch event has occurred.

FIG. 3. shows an example of a Look Up Table. The first column shows a listing of a range of the expected operational speed of the motor expressed in terms of counts of time. From the Table, it should be noted that the counts of time in the first column represent the period for one eight of a motor revolution, and that these counts of time are inversely proportional to the motor speed (with smaller values of counts of time representing faster motor speeds). The third column lists the Trigger Value in counts of time. The Trigger Value, which is discussed in detail below, is compared to the Calculated Difference and used to determine when an anti-pinch event occurs.

Referring specifically to the table shown and again by way of example, if at some point the Stored Value was between 569 and 481 counts of time and the Measured Value is greater than the Stored Value by 38 counts of time, an anti-pinch response would be initiated. The last column of the Look Up Table contains an example of a Correction Factor. The Correction Factor is a value used to modify the Stored Value. This modification of the Stored Value produces Calculated Differences that provide a more robust system against natural speed variations yet not have so great an effect as to mask a real anti-pinch event. The Correction Factor, in this example, is an amount added to the Stored Value in the case where the Measured Value is greater than the Stored Value and an anti-pinch response is not initiated. The values assigned to the Correction Factor could also be increased or decreased to optimize various door systems. In this example an adjustment up would make the system less sensitive to a jamming event, and an adjustment down would make the system more sensitive. Thus the Look-Up Table can be configured to optimize the performance of the algorithm with different door systems.

In an alternative embodiment, the Correction Factor may be applied at a rate of less than every loop thru the algorithm, which in effect would allow fractional Correction Factors. For example, applying a Correction Factor of 2 every third loop would produce an equivalent Correction Factor of two thirds per loop, etc.. Also, while this example describes entry into the Look-Up Table using the Stored Value, it may also be appropriate to enter the Look-up Table using the value of the Measured Value.

While the Preferred Embodiment describes anti-pinch protection during closing, there are closures, such as side sliding windows where sliding glass overlaps the fixed glass. Overlapping glass can create pinch points when the window is opening as well as when it is closing. In these cases it might be advantageous to have anti-pinch protection during both opening and closing of the closure system.

Furthermore, it should be noted that each closure system has a certain amount of inherent springiness. This springiness can be defined by an equivalent spring constant or series of spring constants that result in overall system compliance. The system compliance of each closure system acts in conjunction with the spring constant of the force gage used to measure the force at the point of reversal during an anti-pinch event. The system compliance of the door system can vary widely from door to door and depends on basic door design, seal design and the type of window lift mechanism being used. The anti-pinch activator disclosed herein allows compensation for system compliance in a wide range of door systems by allowing utilization of ring magnets with various numbers of magnet poles, by allowing wide variation in the sampling time of the microprocessor (four micro-seconds in the preferred embodiment), and by allowing single or averaged measurements to define Measured Value. Also the Look Up Table can use various levels of Trigger Values and Correction Factors, which may be fine-tuned to each door system to accommodate system compliance. The Look Up Table shown above has the operating speed of the motor divided into nine different ranges with corresponding Trigger Values and Correction Factors; however, more or less divisions of the speed range can be used depending on the requirements of each door system. More table entries may be used to get better resolution but at the cost of requiring more memory in the micro-processor. Thus the basic anti-pinch activator and algorithm can be utilized with a wide range of variables and be optimized for a wide variety of door systems and customer requirements.

While the disclosed and claimed system is particularly suitable for use in vertical power windows, sliding power windows, sliding roof panels, and hinged or sliding doors for motor vehicles, the system may be applied to many other types of powered closures with little or no modifications. In light of the foregoing disclosure of the invention and description of the preferred embodiments, those skilled in this area of technology will readily understand that various modifications and adaptations can be made without departing from the scope and spirit of the invention. Therefore, all such modifications and adaptations that amount to their equivalences are intended to be covered by the following claims, even if such claims have been modified during prosecution.

What is claimed is:

1. A power closure system with anti-pinch comprising:
- a closure
- a motor operatively connected to the closure;
- a sensor operatively producing signals indicative of motor speed;
- an anti-pinch activator coupled to the sensor and the motor, the anti-pinch activator including:
  - a predetermined trigger value;
  - a measured value taken during an opening or closure of the closure;
  - a stored value created during the opening or closure;
  - a comparator for comparing the measured value with the stored value and initiating a pinch response when the difference between the measured value and the stored value is greater than the trigger value; and
  - a predetermined modifying calculation for changing the stored value during the opening or closure when the measured value indicates a motor speed less than the motor speed indicated by the stored value.

2. The power closure of claim 1, wherein the anti-pinch activator further includes an adjuster for setting the stored value to be equal to the measured value when the measured value indicates a motor speed greater than the motor speed indicated by the stored value.

3. The power closure of claim 1, wherein the measured value is calculated from at least two measurements of speed.

4. The power closure of claim 1, wherein the pinch activator is set to initiate a pinch response with a force of 100 N or less as measured with force gages having spring constants of 10 N/mm, 20 N/mm and 65 N/mm.

5. The power closure of claim 1, wherein the closure comprises a vertical lifting window of a motor vehicle.

6. The power closure of claim 1, wherein the closure comprises a sliding window of a motor vehicle.

7. The power closure of claim 1, wherein the closure comprises a sliding, powered roof of a motor vehicle.

8. The power closure of claim 1, wherein the predetermined correction factor and the pinch threshold are stored in a look-up table and each have multiple values that are correlated to motor speed.

9. A power closure comprising:
- an electric motor having an output shaft;
- a displacement sensor, operatively producing signals indicative of output shaft rotation;
- a closure, drivingly connected to the motor for operable displacement in a generally axial direction responsive to rotation of the motor;
- a closure frame, defining a seated position of the closure; a
- a micro-controller including:
  - means for determining values of T, in counts of time, for a predetermined displacement of the motor drive shaft taing the displacement sensor;
  - means for storing values of T;
  - means for creating the Stored Value from a value of T and changing its value by performing modifying calculations;
  - a Look Up Table, having multiple entries, with each entry representing an incremental portion of the total expected operational speed range of the motor; each said entry containing a Trigger Value and a Correction Factor, wherein the Trigger Value represents a value, which for the incremental operational speed range of the motor for that table entry corresponds to a change in motor speed, and wherein the Correction Factor represents a value, which for the incremental operational speed range of the motor for that table entry corresponds to a change in motor speed and is substantially smaller compared to the Trigger Value; and
  - means for calculating the difference between the Stored Value and the measured value of T, and initiating reversal of the motor if said difference corresponds to a motor rotational speed for the measured value of T being less than the motor rotational speed corresponding to the Stored Value and only when said difference is greater than the Trigger Value obtained from the Look Up Table, and replacing the value of the Stored Value with the measured value of T when the said measured value of T corresponds to a faster rotational speed of the motor compared to the Stored Value, and subtracting the Correction Factor from the Stored Value if said difference indicates a motor speed corresponding to the measured value of T which is less than the motor speed corresponding to the Stored Value.

10. The power closure of claim 9, wherein the measured value of T is calculated from at least two values of T.

11. A method of operating a powered closure for a motor vehicle comprising the steps of:
- setting a predetermined anti-pinch trigger value;

determining a measured value indicative of the speed of the motor during an opening or closure of the closure;

creating a stored value from the measured value during the opening or closure of the closure;

storing the stored value;

calculating a difference between the measured value and the stored value after at least a second value of the measured value is taken and initiating a pinch response when the difference between the measured value and the stored value is greater than the trigger value and the speed of the motor corresponding to the measured value is less than the speed of the motor corresponding to the stored value; and, adjusting the stored value with a predetermined modifying factor if the motor speed corresponding to the measured value is less than the speed of the motor corresponding to the stored value.

12. The method of operating a powered closure of claim 11, wherein the stored value is set to a new value equal to the measured value if the current motor speed indicated by the measured value is greater than the motor speed corresponding to the stored value.

13. The power closure of claim 11, wherein the measured value is calculated from at least two measurements of speed.

14. The power closure of claim 11, wherein the pinch response is set to the force of 100 N or less when generated using a spring constants of 10, 20 or 65 Newtons per millimeter.

15. The power closure of claim 11, wherein the closure comprises a vertical lifting window of a motor vehicle.

16. The power closure of claim 11, wherein the closure comprises a sliding window of a motor vehicle.

17. The power closure of claim 11, wherein the closure comprises a sliding, powered roof of a motor vehicle.

* * * * *

UNITED STATES PATENT AND TRADEMARK OFFICE

CERTIFICATE OF CORRECTION

PATENT NO. : 7,170,244 B2 Page 1 of 1
APPLICATION NO. : 11/084542
DATED : January 30, 2007
INVENTOR(S) : David A. Choby It is certified that error appears in the above-identified patent and that said Letters Patent is hereby corrected as shown below:

At column 4, line 45: please replace “die” with --the--.

At column 5, line 20: please replace “by” with --the--.

At column 8, line 29: please replace “taing” with --using--.

Signed and Sealed this

Tenth Day of April, 2007

JON W. DUDAS
*Director of the United States Patent and Trademark Office*